(12) United States Patent
Kawaguchi

(10) Patent No.: US 7,340,370 B2
(45) Date of Patent: Mar. 4, 2008

(54) RESOLVER SIGNAL PROCESSING DEVICE

(75) Inventor: Hiroshi Kawaguchi, Komaki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/711,955

(22) Filed: Feb. 28, 2007

(65) Prior Publication Data

US 2007/0219733 A1 Sep. 20, 2007

(30) Foreign Application Priority Data

Mar. 15, 2006 (JP) ............................. 2006-071597

(51) Int. Cl.
*G06F 19/00* (2006.01)
(52) U.S. Cl. ...................... 702/151; 340/672
(58) Field of Classification Search ................ 702/151, 702/182–185, 188; 340/672, 686.2
See application file for complete search history.

(56) References Cited

U.S. PATENT DOCUMENTS 6,389,373 B1 5/2002 Ohya

2004/0233079 A1* 11/2004 Takehara .................... 341/116

FOREIGN PATENT DOCUMENTS

JP 3368837 11/2002

* cited by examiner

*Primary Examiner*—Edward Raymond
(74) *Attorney, Agent, or Firm*—Osha Liang LLP

(57) ABSTRACT

A resolver signal processing device includes a control portion, a resolver, and an input/output portion. The control portion includes a memory for storing sine wave data for two cycles, and a DMA controller for transmitting to the resolver the excitation signal including a sine wave. A calculation portion provided in the control portion commands, in initial setting, DMA transfer of the sine wave data for one cycle from a reference phase as the excitation signal, and commands, in detecting the rotational angle, DMA transfer of the sine wave data for one cycle from a modified phase as the excitation signal. The modified phase is determined, in the initial setting, based on the phase difference between the excitation signal and a sine wave output signal or a cosine wave output signal, and the rotational angle of the resolver.

3 Claims, 5 Drawing Sheets

RESOLVER SIGNAL PROCESSING DEVICE

BACKGROUND OF THE INVENTION

1. Field of the Invention

The present invention relates to a resolver signal processing device for use in an EPS-ECU (Electronic Control Unit for Electric Power Steering) and the like.

2. Description of the Related Art

A resolver signal processing device is provided in an EPS-ECU, which is an in-vehicle electronic device, and detects a rotational angle θ of a handle shaft based on a signal from a resolver coupled to the handle shaft.

A resolver induces a phase difference specific to the resolver, between an excitation signal applied to the resolver and resolver output signals (a sine wave output signal and a cosine wave output signal), which necessitates detecting, in advance, the phase difference for detecting the rotational angle θ and canceling a value of the phase difference in detecting the rotational angle.

In initial setting at a predetermined timing such as at power-on of the resolver signal processing device and the like, the phase difference is detected. Thereafter, reference is made to the phase difference, at predetermined time intervals, to detect the rotational angle θ. In general, in order to increase accuracy in detection of the rotational angle θ, peak values of the sine wave output signal and the cosine wave output signal are detected.

In applying an excitation signal to a resolver, a conventional resolver signal processing device increments one by one a read address of a sine-wave ROM storing a sine wave for one cycle to read data which is then transmitted to the resolver (Japanese Patent Publication No. 3368837). Further, in order to compensate for the phase difference, the read starting address of the sine-wave ROM is shifted based on the phase difference.

SUMMARY OF THE INVENTION

However, in detecting the rotational angle, the resolver signal processing device reads data by incrementing one by one the read address of the sine-wave ROM, which imposes a significant burden on a control portion. This disturbs executing other processing or requires use of a device with a higher processing capacity, thereby inducing a problem of increase in a total cost.

The present invention aims at providing a resolver signal processing device capable of reducing a burden imposed on a control portion in applying an excitation signal to a resolver and simplifying processing steps, thereby contributing to increase in speed and cost.

A resolver signal processing device according to the present invention includes an excitation-signal transmitting portion for transmitting to a resolver an excitation signal including a sine wave, and a calculation portion for detecting extremes of a sine wave output signal and a cosine wave output signal from the resolver and detecting a rotational angle θ of the resolver based on the extremes.

If a sine wave excitation signal is transmitted to the resolver, a sine wave output signal and a cosine wave output signal are generated from two output terminals of the resolver. By detecting the extremes of these signals, it is possible to determine the rotational angle θ of the resolver.

The resolver signal processing device according to the present invention includes a storage portion for storing sine wave data for two cycles and a DMA transfer portion for performing DMA transfer of the sine wave data for one cycle from a phase specified in the storage portion as an excitation signal to the resolver. The storage portion and the DMA transfer portion are included in the excitation-signal transmitting portion. In initial setting executed prior to operating the resolver, the specified phase is set as a reference phase. The calculation portion commands the DMA transfer portion to perform DMA transfer of the excitation signal from the reference phase, and detects a phase difference between the excitation signal and the sine wave output signal or the cosine wave output signal.

According to the aforementioned structure, the excitation signal is output to the resolver by DMA transfer. Accordingly, such a processing requires an extremely shorter time, thereby reducing the burden on the calculation portion.

Further, the calculation portion sets a modified phase set forward for the phase difference with respect to the reference phase, commands the DMA transfer portion to perform DMA transfer of the excitation signal from the modified phase, and detects the rotational angle θ based on the extremes, in detecting the rotational angle immediately after the initial setting of the resolver.

Also in detecting the rotational angle by transmitting to the resolver an excitation signal which has been compensated for the phase difference, by use of DMA transfer, the processing requires an extremely short time, thereby reducing the burden on the control portion.

According to the present invention, it is possible to reduce the burden on the control portion in applying the excitation signal to the resolver and to enable transmission of the excitation signal to the resolver only by commanding DMA transfer, which can simplify processing steps, thereby contributing to increase in speed and cost reduction.

DETAILED DESCRIPTION OF THE PREFERRED EMBODIMENTS

Figure 1:
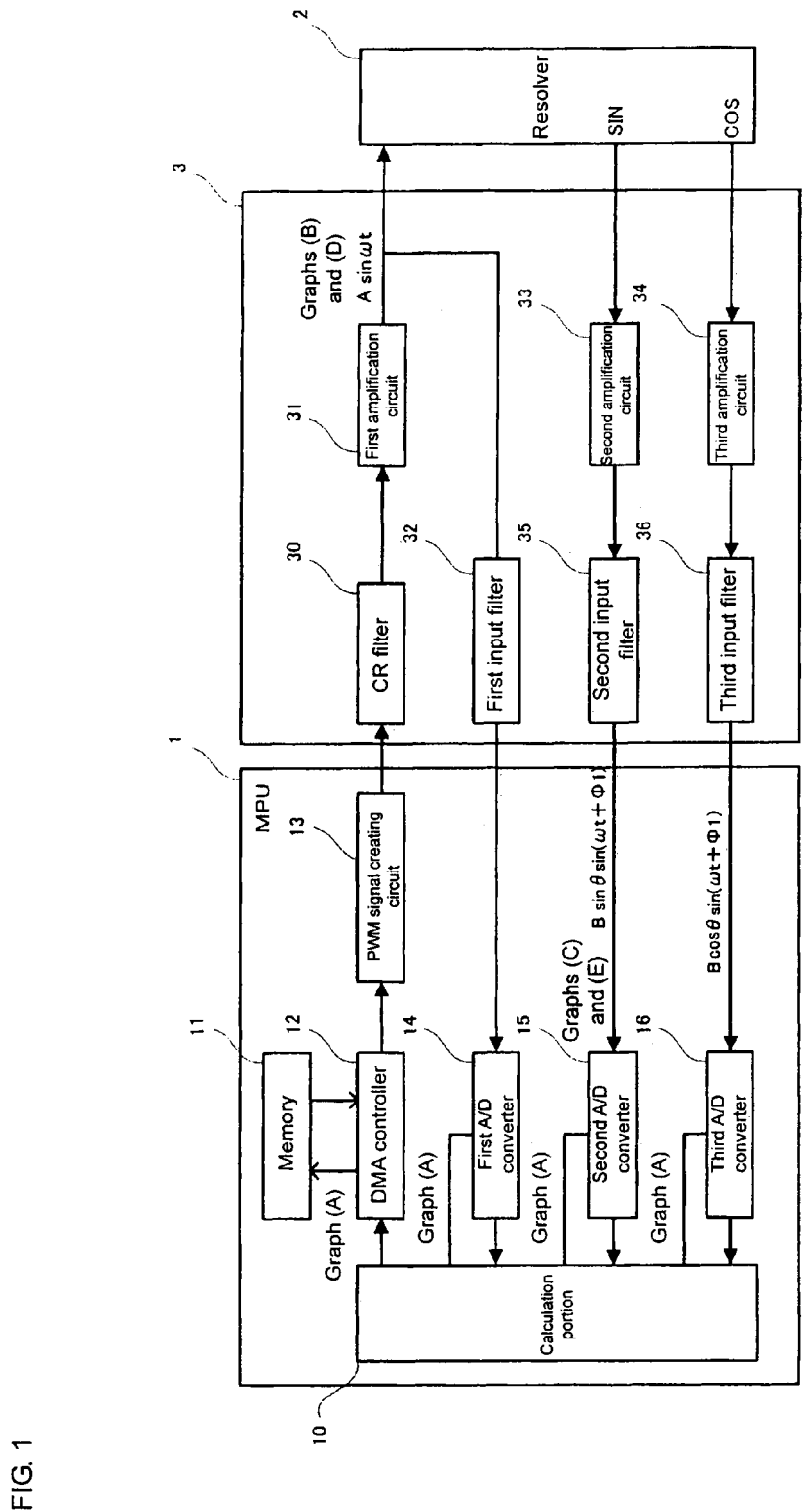
FIG. 1 shows a main-part block diagram of an EPU-ECU according to an embodiment of the present invention.

FIG. 1 shows a main-part block diagram of an EPS-ECU (electric power steering electronic control unit) according to an embodiment of the present invention.

The EPS-ECU is used for realizing a resolver signal processing function for controlling a resolver 2 coupled to a handle shaft in a vehicle and other functions for electric power steering control. This device includes a control portion (MPU) 1 which executes resolver signal processing and other processing, and an input/output portion 3 connected between the control portion 1 and the resolver 2.

The control portion 1 includes a calculation portion 10, and a memory (storage portion) 11 which stores sine wave data for two cycles. The sine wave data stored in the memory 11 is duty ratio data with a value varying depending on the waveform level. The control portion 1 further includes a DMA controller 12 (DMA transfer portion) which performs control for DMA transfer of the sine wave data stored in the memory 11 for one cycle and a PWM signal creating circuit 13 which creates a PWM signal corresponding to the sine wave data (duty ratio data) output from the DMA controller 12. The control portion 1 further includes a first A/D converter 14, a second A/D converter 15 and a third A/D converter 16 which are connected to input terminals of the calculation portion 10.

The input/output portion 3 includes a CR filter 30 for filtering the PWM signal output from the PWM signal creating circuit 13 to convert it into an analog sine wave signal sin ωt, a first amplification circuit 31 for amplifying the sine wave signal into A sin ωt and outputting it as an excitation signal to the resolver 2, and a first input filter 32 for eliminating noises from the signal A sin ωt and feeding it back to the first A/D converter 14 in the control portion 1. Further, the input/output portion 3 includes a second amplification circuit 33 and a third amplification circuit 34 which respectively amplify a sine wave output signal and a cosine wave output signal which are output from the resolver 2, and a second input filter 35 and a third input filter 36 for eliminating noises from the signals amplified by the amplification circuits 33 and 34 and for inputting them to the second A/D converter 15 and the third A/D converter 16. Assuming that the rotational angle of the resolver is θ while not considering other phase delays, a sine wave output signal sin θ sin ωt is output from the resolver 2 to the second amplification circuit 33, while a cosine wave output signal cos θ sin ωt is output from the resolver 2 to the third amplification circuit 34.

Hereinafter, consideration will be made on the phase delay caused by the resolver 2.

The signals output to the calculation portion 10 after being passed through the resolver 2 have a phase delay corresponding to the passage thereof through the resolver 2, relative to the signal which has not been passed through the resolver 2. Accordingly, the signal passed through the second input filter 35 after being passed through the resolver 2 is Bsin θ sin (ωt+φ), while the signal passed through the third input filter 36 is Bcos θ sin (ωt+φ).

The control portion 1 executes two modes which are initial setting and rotational-angle detection, when executing resolver signal processing. The initial setting is performed only once prior to operating the resolver 2, for example, when an ignition key in the vehicle is operated to start operating the EPS-ECU. The rotational-angle detection is performed at predetermined time intervals (for example, every 250 μseconds), after the initial setting. In the initial setting, the control portion 1 outputs an excitation signal A sin ωt to the resolver 2 and receives a sine wave output signal Bsin θ sin (ωt+φ) output from the resolver 2 and passed through the second input filter 35 or a cosine wave output signal Bcos θ sin (ωt+φ) output from the resolver 2 and passed through the third input filter 36 to detect the phase difference (the phase delay by the resolver 2) between the excitation signals A sin ωt and the sine wave output signal Bsin θ sin (ωt+φ) or the cosine wave output signal Bcos θ sin (ωt+φ). In detecting the rotational angle, the control portion 1 refers to the phase difference φ and detects the rotational angle θ based on the sine wave output signal Bsin θ sin (ωt+φ) or the cosine wave output signal Bcos θ sin (ωt+φ).

Further, in the initial setting, the excitation signal A sin ωt output from the first amplification circuit 31 is fed back to the calculation portion 10, which makes a comparison between the fed-back signal and the sine wave output signal Bsin θ sin (ωt+φ) or the cosine wave output signal Bcos θ sin (ωt+φ) to detect the phase difference φ. The output of the first amplification circuit 31 is fed back to the calculation portion 10, as described above, in detecting the phase difference φ, in order to enable ignoring the signal phase delay induced between the DMA controller 12 and the first amplification circuit 31.

The control portion 1 according to the present embodiment operates to switch its mode from the initial setting to the rotational-angle detection when entering resolver signal processing and is structured to execute A/D conversion processing on signals irrelevant to the resolver signal processing, after outputting a command for starting sampling to the first A/D converter 14, the second A/D converter 15 and the third A/D converter 16, until the start of actual sampling processing. Accordingly, sampling processing with the respective A/D converters is started, after an elapse of a certain time (a sampling delay time period D1 to be described later) since the output of the sampling starting command. However, the time period D1 is kept constant since it is set through a program and, also, the processing time is not varied every time and there is no difference among devices. From above, after the initial setting, the control portion 1 determines the sampling delay time period D1 which is a constant time period from the output of the sampling start command to the first A/D converter 14, the second A/D converter 15 and the third A/D converter 16 to the start of actual sampling processing, and then executes rotational-angle detection in consideration of the value D1. This will be described later.

Figure 2:
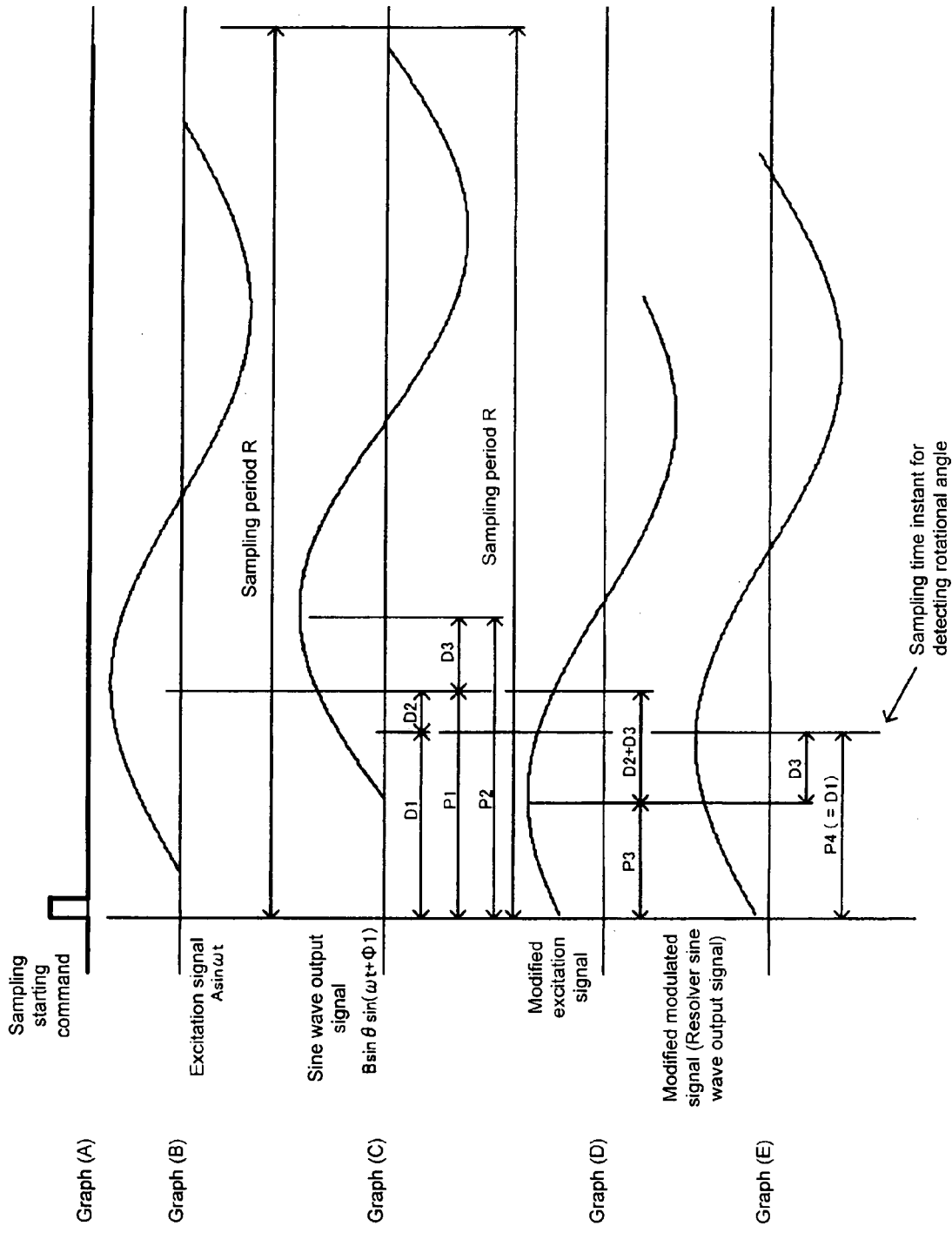
FIG. 2 shows a waveform diagram illustrating operations for resolver signal processing.

FIG. 2 shows a waveform diagram for illustrating operations for the resolver signal processing.

Graphs (A) to (C) illustrate waveforms during initial setting. The graph (A) illustrates a pulse of a sampling starting command, and the graph (B) illustrates an excitation signal A sin ωt. The graph (C) illustrates a sine wave output signal Bsin θ sin (ωt+φ). Further, in initial setting, the control portion 1 selects one of the sine wave output signal Bsin θ sin (ωt+φ) and the cosine wave output signal Bcos θ sin (ωt+φ) output from the resolver 2, for detecting the phase difference. In this case, the rotational angle θ is unknown in initial setting. Assuming that θ is 90 degree, the cosine wave output signal Bcos θ sin (ωt+φ) is zero. Assuming that θ is 0, the sine wave output signal Bsin θ sin (ωt+φ) is zero. Accordingly, the sine wave output signal Bsin θ sin (ωt+φ) is selected for detecting the phase difference when θ is 90 degree, while the cosine wave output signal Bcos θ sin (ωt+φ) is selected for detecting the phase difference when θ is 0 degree.

Referring to FIG. 2, in initial setting, the control portion 1 outputs a sampling starting command to the first A/D converter 14, the second A/D converter 15 and the third A/D converter 16. At the same time, the calculation portion 10 sets, as a reference phase, a specified phase for starting reading of the sine wave data for two cycles stored in the memory 11. The reference phase is set to the first zero phase of the sine wave data for two cycles, namely to the head address of the memory 11. Then, the calculation portion 10 commands the DMA controller 12 to read the sine wave data for one cycle from the reference phase and to perform DMA transfer of the sine wave data.

Figure 3:
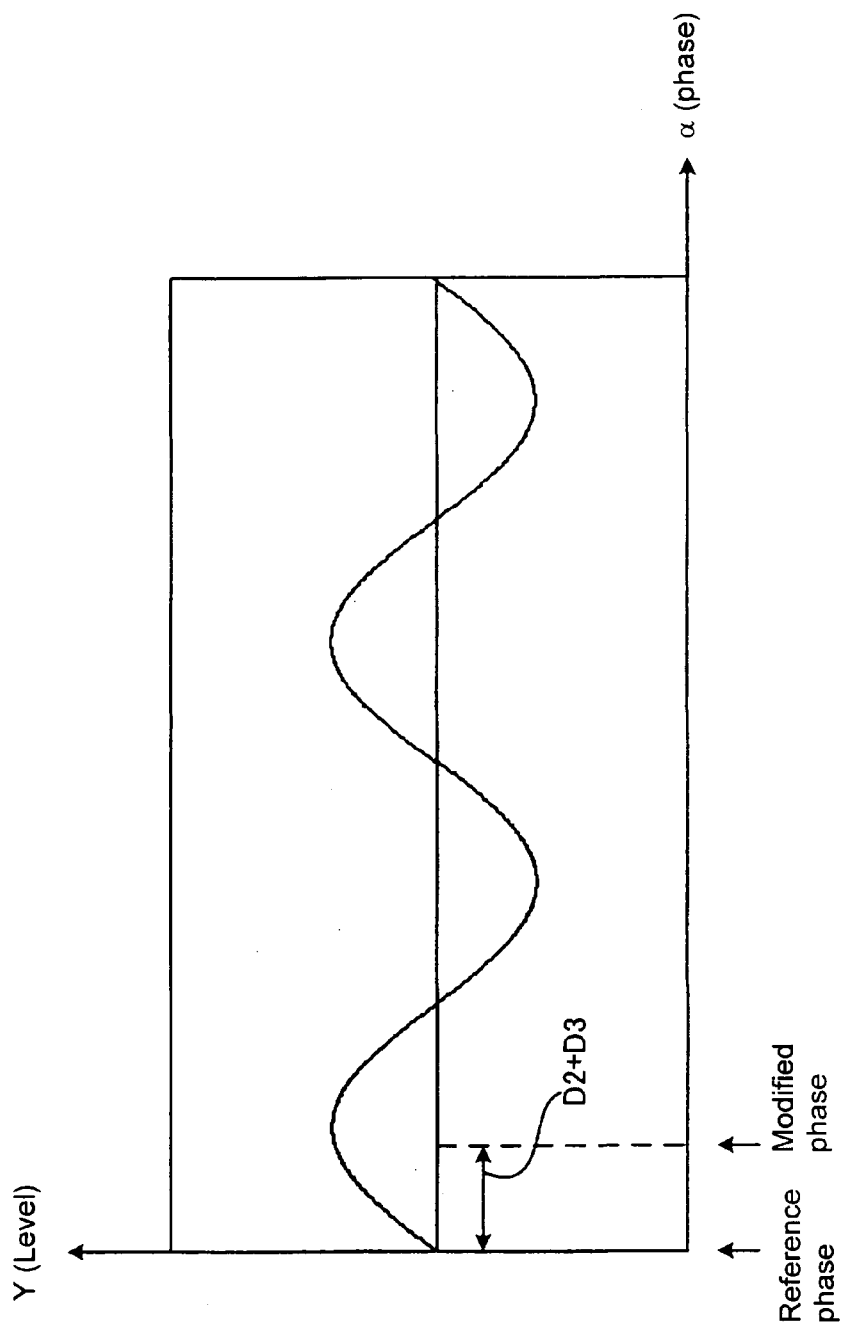
FIG. 3 conceptually shows sine wave data stored in a memory.

FIG. 3 conceptually shows the sine wave data stored in the memory 11. The sine wave data stored in the memory 11 is duty ratio data for use in actually creating a sine wave signal, not data indicating the sine wave value itself. Referring to FIG. 3, the reference position is the first zero-phase position, namely the position of the head address of the memory 11. Accordingly, the DMA controller 12 transfers, to the PWM signal creating circuit 13, the sine wave data for one cycle from the reference phase. With the DMA transfer, the calculation portion 10 can perform other jobs during this transfer. The PWM signal creating circuit 13 creates a PWM signal, based on the duty ratio of the transferred sine wave data, and outputs the PWM signal to the CR filter 30. The CR filter 30 converts the input PWM signal into a sine wave signal sin ωt and outputs it to the first amplification circuit 31. The first amplification circuit 31 amplifies the input sine wave signal sin ωt and outputs it as an excitation signal A sin ωt to the resolver 2. The graph (B) illustrates the excitation signal A sin ωt. The excitation signal A sin ωt is output to the resolver 2 and also is output to the first input filter 32. Namely, the excitation signal A sin ωt is fed back to the control portion 1.

The resolver 2 creates, based on the excitation signal A sin ωt input thereto, a resolver sine wave output signal sin θ sin (ωt+φ) and a resolver cosine wave output signal cos θ sin (ωt+φ), which have been modulated with a sine wave sin θ and a cosine wave cos θ respectively, and outputs them to the second amplification circuit 33 and the third amplification circuit 34, respectively, wherein θ is the rotational angle of the resolver. Further, it is assumed that the rotational angle of the resolver 2 is not varied during the initial setting. Accordingly, sin θ and cos θ have constant values.

The second amplification circuit 33 and the third amplification circuit 34 amplify the resolver sine wave output signal sin θ sin (ωt+φ) and the resolver cosine wave output signal cos θ sin (ωt+φ) input from the resolver 2 to create a sine wave output signal sin θ sin (ωt+φ) and a resolver cosine wave output signal cos θ sin (ωt+φ), respectively, and outputs them to the second A/D converter 15 and the third A/D converter 16 through the second input filter 35 and the third input filter 36 for eliminating noises. The graph (C) illustrates the sine wave output signal Bsin θ sin (ωt+φ).

The first A/D converter 14 samples the excitation signal A sin ωt over one cycle. The result of the sampling will be referred to as an excitation-signal sampling result. Further, the cycle of sampling is 1/100 of the cycle of the excitation signal A sin ωt. Further, in order to enable sampling one whole cycles of the resolver sine wave output signal Bsin θ sin (ωt+φ) and the resolver cosine wave output signal Bcos θ sin (ωt+φ), the period R for repeating sampling is set to be longer than the one cycle.

The control portion 1 is programmed not to execute other processing during the sampling processing by the first A/D converter 14, the second A/D converter 15 and the third A/D converter 16. Therefore, during the sampling processing by the first A/D converter 14, the second A/D converter 15 and the third A/D converter 16, no delay is induced by the calculation portion 10.

The sampling delay time period D1 is the delay time period from the output of sampling starting command to the start of actual sampling. In initial setting, D1 is determined, the respective peak values (the extremes) of the excitation signal A sin ωt and the resolver sine wave output signal sin θ sin (ωt+φ) are determined from the result of sampling and, then, the time instants P1 and P2 from the time point of the output of the sampling starting command to the time points of detection of these peak values are determined. The time instant P1 to detect the peak value of the excitation signal A sin ωt minus the sampling delay time period D1 will be referred to as D2. This D2 is the time period from the start of actual sampling to the detection of the peak value of the excitation signal A sin ωt and will be refereed to as an excitation-signal delay time period. If the sampling delay time period D1 is longer than the peak-value detection time instant P1, then D2 is a negative value. Further, the time period which is the time instant P2 to detect the peak value of the sine wave output signal Bsin θ sin (ωt+φ) minus the sum of the sampling delay time period D1 and the excitation-signal delay time period D2 (namely, the time period resulted from subtraction of P1 from P2) is determined, and the resultant time period will be referred to as D3. This D3 corresponds to the phases of the difference φ and the rotational angle θ relative to the excitation signal A sin ωt and will be refereed to as a modulated-signal delay time period.

Referring to FIG. 2, the sum of the excitation-signal delay time period D2 and the modulated-signal delay time period D3 has the following meaning. Namely, in detecting the rotational angle, by setting forward the excitation signal A sin ωt by the phase corresponding to the value of the sum, it is possible to generate a peak value of the sine wave output signal Bsin θ sin (ωt+φ) at a time instant when the sampling delay time period D1 has elapsed since the output of the sampling starting commands. Therefore, in order to set forward the excitation signal A sin ωt by the phase, namely in order to output the excitation signal A sin (ωt+φ1) (φ1=D1+D2) to the resolver 2 in detecting the rotational angle, the read starting address for DMA transfer from the memory 11 is set to "the reference phase+(D2+D3)=modified phase" (see FIG. 3), wherein φ1 corresponds to the time delay of the output of the resolver 2 which includes the sampling delay time period D1.

The initial setting is completed through the aforementioned processing.

Next, the detection of the rotational angle is conducted.

Immediately after the completion of the initial setting, the detection of the rotational angle is performed. In detecting the rotational angle, the calculation portion 10 outputs, to the DMA controller 12, a DMA transfer command including data indicating an amount of to-be-transferred data for one cycle and the address of the modified phase "the reference phase+(D2+D3)", which is the read starting address, in order to perform DMA transfer of the sine wave data for one cycle from the memory 11. At the same time, the calculation portion 10 outputs a sampling starting command to the first A/D converter 14, the second A/D converter 15 and the third A/D converter 16.

The input/output portion 3 outputs the excitation signal A sin (ωt+φ1) to the resolver 2. The same signal is fed back to the first A/D converter 14 through the first input filter 32. The graph (D) in FIG. 2 illustrates the excitation signal A sin (ωt+φ1). The time instant P3 when the excitation signal A sin (ωt+φ1) illustrated in Graph (D) is peaked is earlier than that of the excitation signal A sin ωt illustrated in Graph (B) by the phase φ1 corresponding to the time period "D2+D3". The resolver 2 outputs a sine wave output signal Bsin θ sin (ωt+φ1), which is sampled by the second A/D converter 15. Further, the resolver 2 outputs a cosine wave output signal Bcos θ sin (ωt+φ1), which is sampled by the third A/D converter 16. Graph (E) in FIG. 2 illustrates the sine wave output signal Bsin θ sin (ωt+φ1).

As described above, it is possible to generate a peak value of the sine wave output signal Bsin θ sin (ωt+φ1) at the time instant P4 when the sampling delay time period D1 has elapsed since the output of the sampling starting command, which can cause the second A/D converter 15 to start sampling at the time instant when the time period D1 has elapsed. Similarly, it is possible to generate a peak value of the cosine wave output signal Bcos θ sin (ωt+φ1) at the time instant when the sampling delay time period D1 has elapsed since the output of the sampling starting command, which can cause the third A/D converter 16 to start sampling at the time instant when the time period D1 has elapsed. After these peak values are obtained, the rotational angle θ can be calculated with a well-known method. Therefore, the calculation portion 10 determines the rotational angle θ of the resolver 2 from these peak values. Namely, the calculation portion 10 determines the rotational angle θ, based on the respective peak values.

Assume that the peak value of the sine wave output signal Bsin θ sin (ωt+φ1) is V1 and the peak value of the cosine wave output signal Bcos θ sin (ωt+φ1) is V2. when in peaked, sin (ωt+φ1) has a value of 1 and, accordingly, V1 equals to Bsin θ and V2 equals to Bcos θ. At this time, the value of B is unknown. Therefore, the ratio between V1 and V2 is calculated.

$$V1/V2 = (B \sin θ)/(B \cos θ) = (\sin θ)/(\cos θ) = \tan θ$$

Consequently, the value of B is canceled.

The peak value V1 of the sine wave output signal is determined by the second A/D converter 15. Further, the peak value V2 of the cosine wave output signal is determined by the third A/D converter 16. On the other hand, a relationship of tan θ'=tan(θ'+π) holds. In this case, the value of the rotational angle θ is determined, based on whether the values of V1=Bsin θ and V2=Bcos θ are negative or positive.

Accordingly, the rotational angle θ equals to tan−1(V1/V2) or the rotational angle θ equals to (tan−1(V1/V2)+π).

When both the values of V1 and V2 are positive, the rotational angle θequals to tan−1(V1/V2). When both the values of V1 and V2 are negative, the rotational angle θ equals to (tan−1(V1/V2)+π). When the value of V1 is positive, but the value of V2 is negative, the rotational angle θ equals to tan−1(V1/V2). When the value of V1 is negative, but the value of V2 is positive, the rotational angle θ equals to (tan−1(V1/V2)+π). Namely, the rotational angle θ can be determined based on the peak values V1 and V2.

Figure 4:
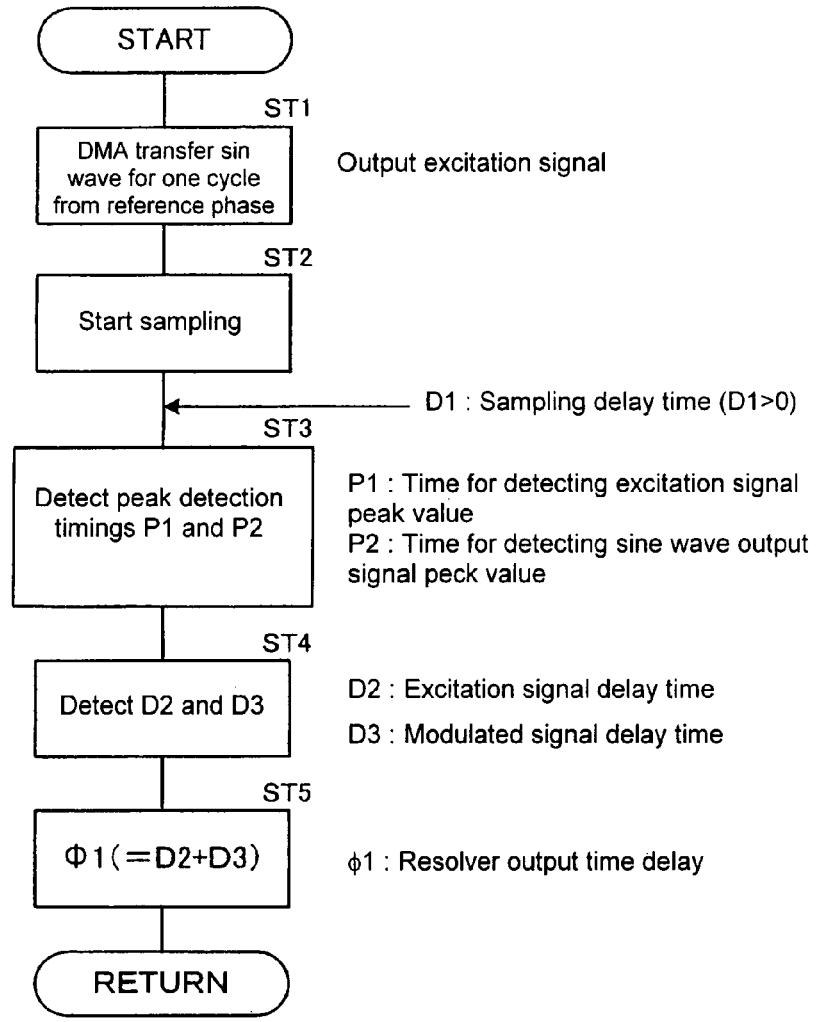
FIG. 4 shows a flowchart of operations in initial setting.
Figure 5:
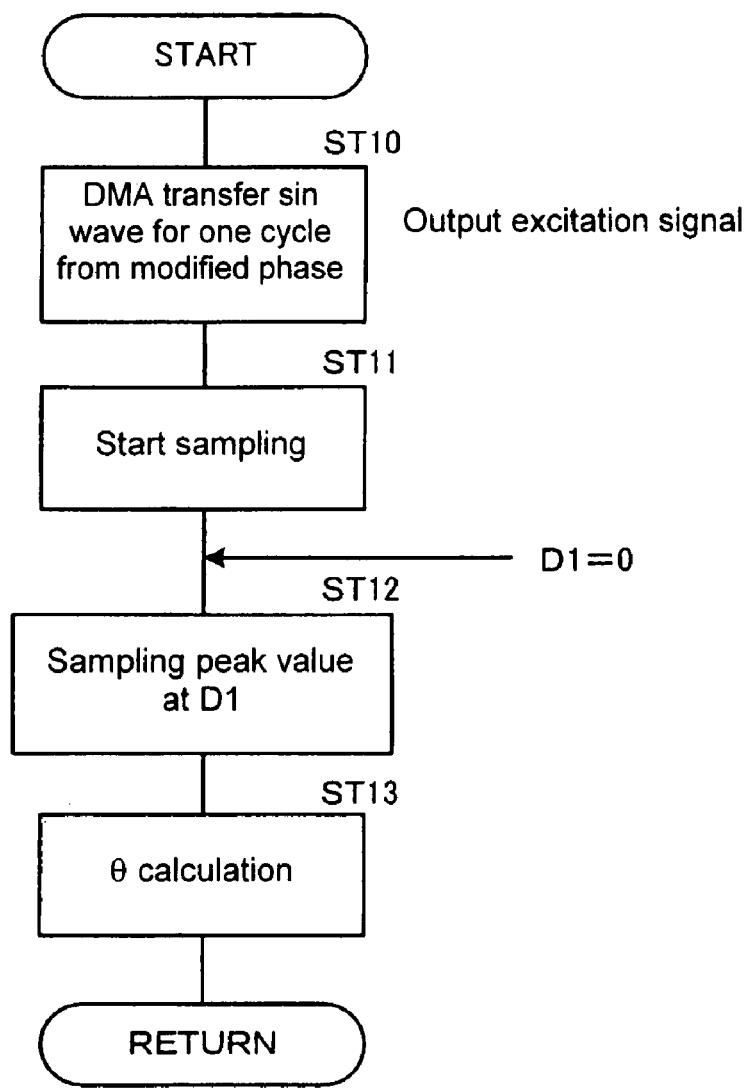
FIG. 5 shows a flowchart of operations in angle detection.

FIGS. 4 and 5 show flow charts illustrating the aforementioned operations. FIG. 4 shows the operation in initial setting, and FIG. 5 shows the operation in detecting the rotational angle. The initial setting is executed only once prior to operations of the resolver 2, for example, when the ignition key in the vehicle is operated to start operations of the EPS-ECU. The detection of the rotational angle is executed at predetermined time intervals (for example, every 250 μseconds) after initial setting.

Referring to FIG. 4, the calculation portion 10 outputs, to the DMA controller 12, a command for DMA transfer of sine wave data for one cycle from the reference phase, at a step ST1, and concurrently outputs a sampling starting command, at a step ST2. When the sampling delay time period D1 has elapsed since the output of the sampling starting command, actual sampling is started. At a step ST3, the time instant P1 to detect the peak of the excitation signal A sin ωt and the time instant P2 to detect the peak of the sine wave output signal Bsin θ sin (ωt+φ1) (in this case, φ1=D1+D2) are determined.

At a step ST4, the excitation-signal delay time period D2 and the modulated-signal delay time period D3 are determined from the values. Further, at a step ST5, the resolver output signal time delay φ1 (=D2+D3) is determined. The value of φ1 is set as the modified phase and, therefore, is set as the starting address for reading the sine wave data to be DMA-transferred in the subsequent rotational-angle detection. Through the aforementioned steps, the initial setting is completed.

In the detection of the rotational angle in FIG. 5, at a step ST10, the calculation portion 10 outputs, to the DMA controller 12, a DMA transfer command for causing it to read the sine wave data for one cycle from the modified phase and to perform DMA-transfer thereof to the PWM signal creating circuit 13. At this time, the excitation signal output to the resolver 2 is an excitation signal A sin (ωt+φ1). At a step ST2, a sampling starting command is output. In the present embodiment, at this time, no sampling delay is caused by the first A/D converter 14, the second A/D converter 14 and the third A/D converter 16. Accordingly, the sampling delay time period D1 is zero. Therefore, at a step ST12, the second A/D converter 15 and the third A/D converter 16 start sampling of the sine wave output signal Bsin θ sin (ωt+φ1) and the cosine wave output signal Bcos θ sin (ωt+φ1), at the time instant when the sampling delay time period D1 determined in the initial setting has elapsed. With the sampling, peak values of the sine wave output signal and the cosine wave output signal output from the resolver are obtained. Then, at a step ST13, the calculation portion 10 calculates the angle θ of the resolver 2.

According to the aforementioned process procedure, the calculation portion 10 is only required to generate a DMA transfer command to the DMA controller 12 in outputting an excitation signal to the resolver 2, which can reduce the burden on the calculation portion 10. This allows the EPS-ECU to execute other processing, thereby increasing the operation efficiency of the EPS-ECU. Furthermore, only the step of generating a DMA transfer command is required as a program step. Further, since DMA transfer can only increment the read address, in a structure to store in the memory 11 sine wave data for one cycle, it is impossible to output the sine wave data for one cycle, in a case where reading of the sine wave data is started at a modified phase. However, by storing sine wave data for two cycles in the memory 11 as in the present embodiment, it is possible to perform DMA transfer of sine wave data for one cycle, regardless of the magnitude of the modified phase, namely the magnitude of the phase difference detected in the initial setting.

The invention claimed is:

1. A resolver signal processing device comprising:
an excitation-signal transmitting portion for transmitting an excitation signal including a sine wave to a resolver; and
a calculation portion for detecting extremes of a sine wave output signal and a cosine wave output signal from the resolver and detecting a rotational angle of the resolver based on the extremes, wherein
the excitation-signal transmitting portion includes:
a storage portion for storing sine wave data for two cycles, and
a DMA transfer portion for performing DMA transfer of the sine wave data for one cycle from a phase specified in the storage portion as the excitation signal to the resolver, and
the calculation portion
commands the DMA transfer portion to perform DMA transfer of the excitation signal from a reference phase, and detects a phase difference between the excitation signal and the sine wave output signal or the cosine wave output signal, in initial setting prior to operating the resolver; and
commands the DMA transfer portion to perform DMA transfer of the excitation signal from a modified phase set forward for the phase difference with respect to the reference phase, and detects the rotational angle based on the extremes, in detecting the rotational angle immediately after the initial setting.

2. A resolver signal processing method comprising the steps of:

transmitting an excitation signal including a sine wave to a resolver;

detecting extremes of a sine wave output signal and a cosine wave output signal from the resolver; and detecting a rotational angle of the resolver based on the extremes, wherein in initial setting prior to operating the resolver, sine wave data for one cycle from a reference phase in the sine wave data for two cycles stored in the storage portion is DMA transferred to the resolver as the excitation signal;

a phase difference between the excitation signal and the sine wave output signal or the cosine wave output signal is detected;

in detecting the rotational angle subsequent to the initial setting of the resolver, a modified phase set forward for the phase difference with respect to the reference phase is set, and the sine wave data for one cycle from the modified phase in the sine wave data for two cycles stored in the storage portion is DMA transferred to the resolver as the excitation signal; and the extremes of the sine wave output signal and the cosine wave output signal from the resolver is detected, and the rotational angle of the resolver is detected based on the extremes.

3. A resolver signal processing method comprising:

transmitting an excitation signal including a sine wave to a resolver;

detecting extremes of a sine wave output signal and a cosine wave output signal from the resolver;

detecting a rotational angle of the resolver based on the extremes;

storing sine wave data for two cycles;

performing DMA transfer of the sine wave data for one cycle from a specified phase as the excitation signal to the resolver, and performing DMA transfer of the excitation signal from a reference phase;

in initial setting, prior to operating the resolver, detecting a phase difference between the excitation signal and the sine wave output signal or the cosine wave output signal;

performing DMA transfer of the excitation signal from a modified phase set forward for the phase difference with respect to the reference phase; and detecting the rotational angle immediately after the initial setting.

* * * * *